United States Patent

Crowley et al.

[11] 3,966,600
[45] June 29, 1976

[54] PROCESS FOR THE TREATMENT OF WASTE WATER FROM A FIBERGLASS MANUFACTURING PROCESS

[75] Inventors: Thomas N. Crowley, Myrtle Beach, S.C.; David M. Urbanski, Philadelphia, Pa.

[73] Assignee: Amchem Products, Inc., Ambler, Pa.

[22] Filed: Mar. 28, 1975

[21] Appl. No.: 563,029

[52] U.S. Cl. ................................. 210/46; 210/51; 65/27
[51] Int. Cl.² .......................................... C02B 1/20
[58] Field of Search .................. 210/47, 51, 45, 52, 210/54, 56, 60, 59, 61, 53, 46; 65/27

[56] References Cited
UNITED STATES PATENTS

| | | |
|---|---|---|
| 3,355,444 | 11/1967 | Kalafatas et al. .................... 210/53 |
| 3,356,565 | 12/1967 | Smucker et al. ...................... 65/27 |
| 3,539,510 | 11/1970 | Priesing et al. ...................... 210/52 |
| 3,791,807 | 2/1974 | Etzel et al. ........................... 210/70 |
| 3,804,751 | 4/1974 | McCord et al. ...................... 210/50 |

Primary Examiner—Charles N. Hart
Assistant Examiner—Benoit Castel
Attorney, Agent, or Firm—Ernest G. Szoke; Michael E. Zall; Ruth S. Tong

[57] ABSTRACT

A process to reduce the chemical oxygen demand and total solids content of waste water from a fiberglass manufacturing process comprises acidifying the waste water to a pH of from about 2.5 to about 5.5 by the addition of a non-toxic inorganic acid; neutralizing the acidified water to a pH of from about 7 to about 9 by the addition of a non-toxic inorganic base; adding a flocculating agent to the treated water; and separating the suspended solid material from the treated water.

1 Claim, 2 Drawing Figures

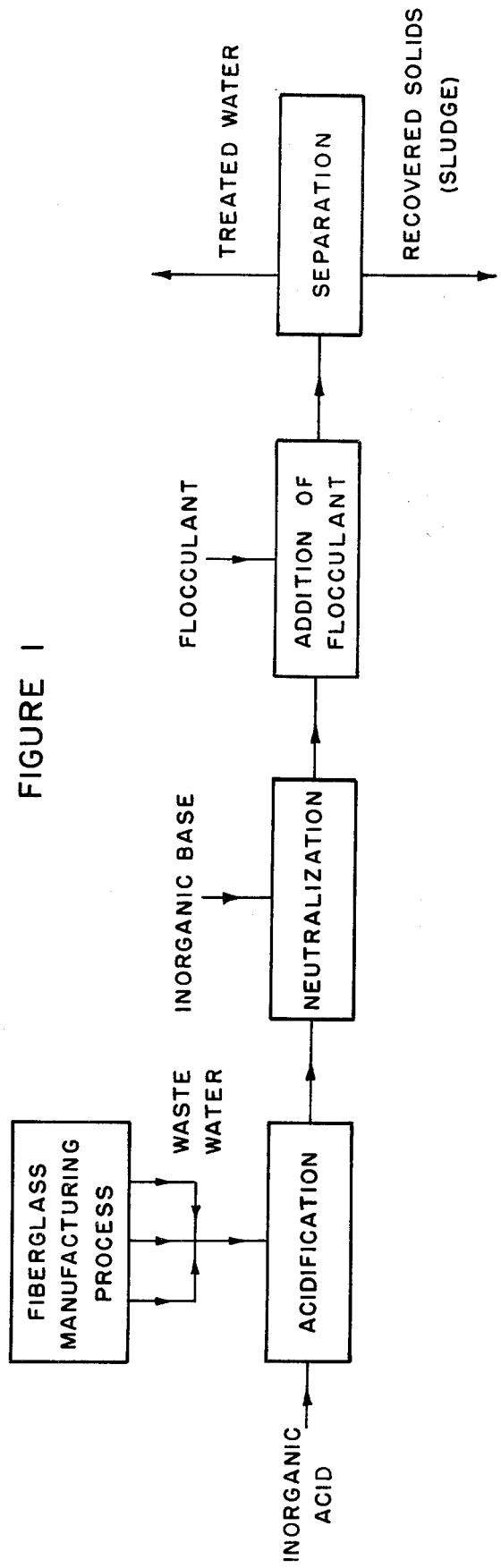
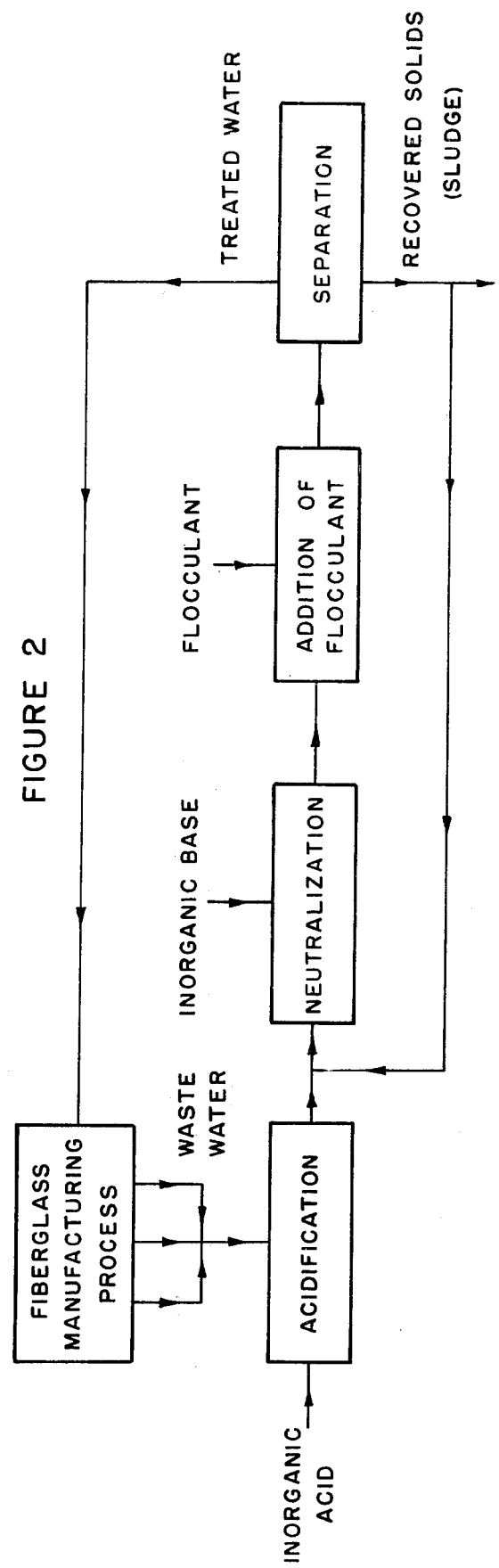

PROCESS FOR THE TREATMENT OF WASTE WATER FROM A FIBERGLASS MANUFACTURING PROCESS

BACKGROUND OF THE INVENTION

The purification of waste water is an important part of virtually any modern industrial process. In particular, much effort has been expended in recent years in insuring that the risk of pollution is minimized by treating waste water before it is discharged into rivers and other water-ways. Another important reason for the treatment of waste water is that it enables the water to be re-used in the industrial processes, so forming a closed cycle which is both more efficient and thus more economical. A further economical consideration is that the solid material recovered in the treatment of waste water may, in some instances, be a usable and valuable material in itself.

This invention relates to the treatment of waste water produced in a fiberglass manufacturing process, which enables the water to be recycled through the fiberglass manufacturing process.

There are four major uses for water in a fiberglass manufacturing process. Firstly, cooling water is required for furnaces, compressors and the like. Secondly, water is used to quench the molten glass should the process have to be stopped for any reason. When the molten glass is quenched in this manner it rapidly solidifies and fractures into fragments called cullet. Thirdly, water is used to carry away waste glass fibers and binder from the area in which the fiberglass is formed. Fourthly, water is used in a scrubber system to reduce air pollution. The water used in these four areas makes up the majority of the waste water of a fiberglass manufacturing process.

The principal contaminants carried by the waste water used in the above procedures are glass fiber particles and waste binder. The binder is normally a urea-formaldehyde resin or phenol-formaldehyde resin, and gives rise to dissolved and suspended solids in the waste water. The resin is formed by reacting urea or phenol with formaldehyde, and heating the mixture to give varying degrees of polymerization. The dissolved solid contamination in the water results from resin solids with a low degree of polymerization which are water-soluble. Such resin solids, if recovered, would be reusable in the process. The suspended solid contamination comprises glass particles and those resin solids which have been polymerized by the heat in the forming process to such an extent that they are water-insoluble.

It is the presence of the organic material in the waste water which gives rise to the high chemical oxygen demand (C.O.D.), and a reduction of the organic material leads to a reduction in C.O.D. The reduction of C.O.D. is very important if the treated waste water is to be discharged into a river, since a high C.O.D. would mean that the waste water consumed the oxygen in the river water which supports the plant and animal life therein.

If the waste water were not treated, it would be possible to recycle it to a very limited extent until the level of contamination rose to an unacceptable level. However, the solids content rapidly builds up to an unacceptable level — even as high as 7 to 8% — and it is then necessary to shut down the plant and clean out the water system. If this is not done the efficiency of the process suffers badly, and in particular the spray system, by which water is sprayed onto the fiberglass to remove waste materials, is reduced in efficiency, since a high concentration of resin or fiberglass particles blocks the spray nozzles.

Accordingly, it is highly desirable to treat the waste water in order to maintain the contamination at an acceptable level for as long as possible, so as to maximize the time between stoppages, or eliminate stoppages completely. In the past a number of chemical treatments have been utilized for such a purpose, although none have been entirely safisfactory in treating the waste water from a fiberglass manufacturing process.

One treatment that has been employed to a significant extent uses alum as a coagulating agent to promote precipitation of solid contamination. However, the use of this compound did not give entirely satisfactory results, and also suffered from the additional problem that it introduced aluminum ion into the water which is not desirable because aluminum shows some toxicity to plants.

In another process for the recycling of waste water from a fiberglass manufacturing plant, barium hydroxide is added to the waste water to improve its detergent properties, and a part of the water treated with barium hydroxide is drawn off and used in the formation of binder for the process. This draw-off portion of the waste water is acidified with a weak acid such as ammonium sulfate to reduce the alkalinity of the water to about pH 7 before it is employed in binder make-up. However, this process allows the dissolved ions in the bulk of the waste water to rise to a high level, and it should be pointed out that barium ion is also an undesirable constituent of the treated waste water because of its high toxicity.

It is an object of the invention, therefore, to provide an effective treatment for waste water from a fiberglass manufacturing process to reduce its solids content without introducing toxic ions into the water.

It is also an object of the invention to reduce the chemical oxygen demand of the waste water from a fiberglass manufacturing process.

SUMMARY OF THE INVENTION

Accordingly, this invention provides a process for the treatment of waste water from a fiberglass manufacturing process to reduce chemical oxygen demand and also reduce the content of both dissolved and suspended solids therein, which comprises the steps of:
a. acidifying the waste water to a pH of from about 2.5 to about 5.5 by the addition of a non-toxic inorganic acid;
b. neutralizing the acidified water to a pH of from about 7 to about 9 by the addition of an nontoxic inorganic base, the base being capable of forming, with the inorganic acid added in step a), an insoluble inorganic salt;
c. adding a flocculating agent to the neutralized water to promote the separation of solid material from the treated water; and
d. separating the solid material from the treated water.

DETAILED DESCRIPTION OF THE INVENTION

By the terms "non-toxic" as used in connection with the inorganic acid and inorganic base herein, it is meant that these compounds will not introduce any ions into the waste water that are considered, having regard to the concentrations in which they will be present, as being harmful or toxic to animals and plants or in any way undesirable in effluent discharge into rivers and the like. Thus, excluded by the term non-toxic are compounds containing cations such as the heavy metal ions - for example, barium - and anions such as cyanide.

An important feature of the present invention is that the inorganic acid and inorganic base react to form an insoluble compound which precipitates out, absorbing dissolved material, reducing chemical oxygen demand, and providing nuclei for enhancing the precipitation of suspended solids. As indicated above, the inorganic acid and base are selected in order to produce such a compound. It is pointed out that no compound can be absolutely insoluble, but as used herein the term "insoluble" is intended to mean those compounds that are commonly referred to under that heading, being substantially insoluble. By way of illustration it may be said that the preferred "insoluble inorganic salts" have a solubility of less than $pH_{SP}$ 8.0.

Obviously the choice of the inorganic acid and inorganic base for use in the process of the invention cannot be made independently, since they must give rise to that insoluble inorganic salt. Preferred inorganic acids for use in the process of the invention are phosphoric acid and sulfuric acid, since these form a large number of insoluble salts with a variety of cations. Moreover, the phosphate and sulfate anions are substantially non-toxic in the concentrations in which they will be used in the process of the invention. Another inorganic acid which may be used is carbonic acid — this being conveniently formed in situ by passing carbon dioxide gas through the waste water to give the desired pH.

Preferred inorganic bases for use in the process of the invention are the alkaline-earth metal bases, and in particular the basic calcium and magnesium compounds. These basic compounds are preferably the hydroxides of the alkaline-earth metals but, in some instances, the oxide may also be used. The highly preferred inorganic base for use in the process of the invention is calcium hydroxide because it is substantially non-toxic at the concentrations employed, and this base is preferably added in the form of dolomitic lime or high-calcium lime (which are commercially available forms of calcium hydroxide).

Amongst the possible permutations of compounds for use in the process of the invention, the particularly preferred process uses phosphoric acid and calcium hydroxide (or calcium oxide). This preferred combination would, of course, form calcium phosphate in the waste water being treated.

In the acidification step, the waste water is preferably brought to a pH of from about 3.5 to about 5.5, and optimum results (in terms of economy) have been obtained with a pH of from about 3.5 to 5.0. The acidification stage has the effects of destabilizing colloidal material, rendering the resin present in the waste water capable of a partial room temperature cure, and also emulsifying the binder to a degree that the precipitated resinous materials will occlude any extractable material released therein.

The pH attained in this, and the subsequent neutralization, stage may be ascertained either by monitoring the pH of the waste water directly using a pH meter, or by controlled proportional flow of the reactants through adjustable volume pumps. Whichever method is employed, it is convenient if the acid is added at a concentration of from about 100 to about 2,500 ppm, and it is particularly preferred that the concentration of the added acid be in the range of from about 250 to about 1,000 ppm.

It has been found that an elevated temperature assists in the curing of the resin at the acidification stage of the process, and is preferred that this stage is carried out at a temperature of from about 70° to about 200°F, most preferably at a temperature of from about 130° to about 170°F. This temperature range is particularly convenient since it is the typical temperature range of waste water collected from a fiberglass manufacturing process.

The neutralization step consists of the addition of the chosen inorganic base in order to raise the pH of the waste water to from about 7 to about 9. Preferably the pH attained falls within the narrower range from about 7.5 to about 8.5, since this gives approximately stoichiometric neutralization of the acidified waste water. As indicated above, the acid and base are chosen to form an insoluble salt and this is precipitated in the waste water. It has been found that by forming the precipitate in the pH range specified for the process of this invention a large amount of the impurities to be removed are absorbed onto the precipitate.

The formation of a precipitate is further enhanced by the next step of the process — the addition of a flocculating agent. This flocculating agent acts to make the particle size bigger and so promotes the formation of a precipitate from the suspended solids in the waste water. It also has the effect of making the formed inorganic precipitate more efficient at absorbing dissolved organic material. Preferably the flocculant used is anionic in character, and particularly preferred agents are high molecular weight, water soluble, anionic polyacrylamides — for example, that available from the Dow Chemical Company and known as Separan AP-273.

Finally, the formed solids are separated from the treated water, and this is preferably carried out in a device known as a thickener. In a thickener the water/solids mixture is continuously fed to a large vessel wherein the solids settle out as a sludge and the treated water (less solids) continuously overflows the top of the vessel and is collected. The solids form a sludge on the bottom of the thickener, and periodically this sludge may be drawn off and, if desired, subjected to a further separation procedure — for example, by centrifuging to separate out more of the water.

It is to be understood that the thickener is the preferred method of separation of water from solids, but a variety of other techniques may be employed — such as filtration, centrifuging or inclined tube separation — as would readily be appreciated by one skilled in the art.

In the preferred process of the invention the treated water obtained from the separation stage is returned for use in the fiberglass manufacturing process, thus forming a closed loop. The treated water has had the dissolved and suspended solids reduced and also had the pH adjusted to an acceptable level, and so this treated water is acceptable for use in the fiberglass manufacturing process. It may be used in any of those functions where water is required, which as pointed out above include:

a. cooling apparatus;
b. quenching molten glass;
c. spraying the formed fiberglass mat to remove excess material and waste; and
d. use in air scrubbers to reduce pollution.

The water treated by the method of this invention is suitable for use in any of these functions since the contaminats (organin material and glass particles), which would have caused blockages and inefficiency if the water had not been treated, have effectively been reduced.

This recycling of the water in a fiberglass manufacturing plant represents a considerable increase in efficiency and economy since it allows a closed system to be used for long periods of time with only small additions of fresh water to make up for evaporation losses and so on, and without the need for frequent shut-downs to clean out the water system.

In a particularly preferred embodiment of the present invention, some of the solid material (sludge) obtained from the separation stage of the process is recycled and introduced into the waste water being treated, between the acidification and neutralization stage. This addition of the sludge to the waste water leads to the formation of nuclei and the promotion of precipitate formation, eventually giving rise to a clearer treated water product. The sludge recycling has the effect, therefore, of further increasing the efficiency of the treatment process of the invention. Typically, from 10 to 20% (by weight) of the sludge obtained from the separation step would be recycled in this manner. Practical tests have shown that the use of the process of the invention to treat the waste water of a fiberglass manufacturing plant in which the sludge recycled is employed enables the water used in the plant to be recycled for long periods of time without shut-downs for cleaning operations.

A significant advantage of the present invention is that the sludge recovered from the separataion step which is not recycled may be utilized in a number of ways, and is a valuable by-product of the process. Inn particular, when the acid is phosphoric acid and the base a calcium salt, the formed precipitate will be calcium phosphate and this is very useful as to adjust the alkalinity of soils.

This invention has enabled substantial reduction in total solids content to be obtained - typically levels in the region of 3% total solids have been obtained. This is to be contrasted with prior art procedures which have only effected a reduction to about 6% total solids.

The invention will now be described, though only by way of illustration, with reference to the accompanying drawings, in which:

FIG. 1 is a schematic block diagram of the process for treatment of waste water according to the invention; and FIG. 2 is a schematic block diagram of a preferred embodiment of the process for treatment of waste according to the invention.

FIG. 1 shows, in block form, the sequence of steps in the process of the invention. Waste water is gathered from various parts of the fiberglass manufacturing process, and subjected to the sequence of steps: -
 a. acidification, by addition of an inorganic acid, to a pH of from 2.5 to 5.5;
 b. neutralization, by addition of an inorganic base, to a pH of from 7 to 9;
 c. addition of flocculant;
 d. separation of solid material to give water of reduced solids content acid reduced C.O.D.

FIG. 2 shows the preferred process according to the invention in which the waste water is subjected to steps a) and d) as described above. However, in this preferred process the treated water obtained from the separation step d) is returned for use in the fiberglass manufacturing process. Also the sludge obtained in step d) is in part returned to the acidified waste water to improve the overall efficiency of the process as described hereinbefore.

The following Examples are now given, though only by illustration to show preferred materials, conditions and techniques that may be employed in the process of the invention.

Example 1

Process employing calcium hydroxide and phosphoric acid

A small scale treatment system according to the invention was set up using treatment tanks of approximately 15 gallons capacity, each tank being equipped with a mixer and overflow lines for use with a continuous flow technique. The addition of Chemicals to these tanks was made by gravity flow from small mixing vessels, the rate of addition of the chemicals being governed by the rate of flow from the mixing vessels to the treatment tanks. There were three treatment tanks and the waste water to be treated was fed through them sequentially by continuous flow techniques. The overflow from the third treatment tank was fed to a thickener of approximately 100 gal. capacity provided with a pump for drawing off solids from the bottom of the thickener for recycling. The treated water was obtained as an overflow from this thickener.

Waste water from a fiberglass manufacturing plant was fed through the treatment system at approximately 0.5 gal. per minute (30 gal. per hour), which represents a scale down of approximately 200:1 from a full scale industrial system.

In the first treatment tank the waste water was acidified by the addition of phosphoric acid to produce a pH of from about 3.4 to about 5.4.

In the second treatment tank a portion of the sludge obtained from the thickener was added to the acidified water in order to promote the formation of a precipitate.

In the third treatment tank the pH of the acidified waste water was adjusted to between 7.5 and 8.0 by the addition of a lime slurry of a concentration of approximately 0.5 lbs. calcium hydroxide per gal. A polymeric flocculant was also added to the treated waste water in this treatment tank.

As stated hereinbefore, the overflow from the third stage was fed to the thickener where the formed solid material was separated from the treated water.

The treatment process was run for approximately 10 hours and the results obtained are shown in the table below. The solids contents of the treated and untreated waters were determined using standard A.P.H.A. methods.

|  | Waste Water | Treated Water |
|---|---|---|
| pH | 7.8 | 8.0 |
| Total Solids (ppm) | 36,200 to 41,300 | 29,000 to 30,600 |
| Dissolved Solids (ppm) | 24,500 to 36,900 | 29,000 to 30,600 |
| Suspended Solids (ppm) | 1,700 to 3,400 | — |
| Volatile Solids (ppm) | 35,000 to 39,900 | 27,900 to 29,200 |

These results show the considerable decrease in dissolved and suspended solid content obtained using the process of this invention.

EXAMPLES 2 and 3

A simulation of the process of the invention was run on a reduced scale in the laboratory to assess the effectiveness of various inorganic acid and base combinations.

Waste water from a fiberglass manufacturing process was treated, the waste water having the following properties:

pH 7.1
C.O.D. 30,400 ppm (measured by standard A.P.H.A. methods)

Samples of this waste water were subjected to the following treatments.

Example 2

Magnesium hydroxide and Phosphoric acid

A sample of the waste water was acidified by adding 0.4 ml/l (5.3 lbs/1,000 gal.) 75% phosphoric acid to obtain a pH of 5.5. The acidified water was then neutralized by the addition of 6.0 g/l (50 lbs./1,000 gal.) of magneisium hydroxide in the form of a slurry. The pH of the neutralized water was 8.5, and to this was added a flocculant, Separan AP273 (available from The Dow Chemical Company), to promote the formation of a precipitate. The formed solid material was then separated from the treated water by means of a thickener, in which the solid material formed a precipitate on the bottom of the thickener, while the treated water constantly overflowed the thickener vessel as a supernatant liquid and was collected.

The properties of the treated water were as follows:

pH 8.5
C.O.D. 16,800 ppm.

Thus, it may be seen that the pH of the treated water is at an acceptable level, and the C.O.D. reduced markedly when compared with the untreated waste water.

Example 3

Calcium hydroxide and phosphoric acid

A second sample of the waste water was treated in the manner described in Example 2, but using calcium hydroxide slurry rather than magnesium hydroxide. The pH in the neutralization stage was again raised to 8.5 but in this run this was achieved by the addition of 22 m/l of High Calcium Lime which corresponds to the addition of 22 lbs/1,000 gal. of calcium hydroxide.

The treated water obtained from this treatment had the following properties:

pH 8.5
C.O.D. 15,040

Again, this treated water has a markedly reduced C.O.D.

We claim:

1. A process for the treatment and recycling of waste water from a fiberglass manufacturing process contaminated with both water soluble and insoluble resins together with non resin particulate material, which comprises:
   a. acidifying the waste water at a temperature from about 70° to about 200° F by the addition of an inorganic acid selected from the group consisting of sulfuric, carbonic and phosphoric acid in an amount sufficient to give acidified water having a pH of from about 3.5 to about 4.5;
   b. neutralizing the acidified waste water by the addition of a base selected from the group consisting of:
      i. calcium oxide;
      ii. Calcium hydroxide; and
      iii. magnesium oxide,
   in an amount sufficient to give neutralized water having a pH of from about 7.5 to about 8.5, the acid of step a) and the base being selected so as to form a water insoluble inorganic salt.
   c. adding an anionic polyelectrolyte flocculating agent to promote separation of solid material obtained from step c)
   d. separating the solid material from the neutralized water, and adding a part of the solid material to the acidified water between steps a) and b); and
   e. returning the neutralized water separated from the solid material to the fiberglass manufacturing process.

* * * * *